United States Patent [19]
Hawkins

[11] 4,373,984
[45] Feb. 15, 1983

[54] MACHINE FOR APPLYING TRANSFER FOIL TO A SHAPED EDGE OF A SUBSTRATE

[75] Inventor: James H. Hawkins, Anderson, Calif.

[73] Assignee: Voorwood Company, Anderson, Calif.

[21] Appl. No.: 169,375

[22] Filed: Jul. 16, 1980

[51] Int. Cl.[3] ........................ B32B 31/00; B65C 1/00; B32B 3/04

[52] U.S. Cl. ................................ 156/477.1; 156/540; 156/535; 156/583.3; 156/468; 156/493; 156/238; 156/249

[58] Field of Search ............... 156/499, 540, 542, 541, 156/230, 233, 238, 249, 274, 289, 309.9, 535, 361, 583.91, 583.7, 583.3, 582, 468, 360, 488, 486, 493, 477 R, 475; 101/33, 34

[56] References Cited

U.S. PATENT DOCUMENTS

| | | | |
|---|---|---|---|
| 1,969,660 | 8/1934 | McLaurin | 156/499 |
| 2,057,061 | 10/1936 | Eggerss | 156/468 |
| 2,654,687 | 10/1953 | Fridolph | 156/230 |
| 3,200,029 | 8/1965 | Cross | 156/540 |
| 3,669,793 | 6/1972 | Billings | 156/238 |
| 4,081,304 | 3/1978 | Bruseschi | 156/477 |
| 4,118,264 | 10/1978 | Boettcher | 156/230 |
| 4,288,275 | 9/1981 | Davis | 156/540 |

*Primary Examiner*—Edward C. Kimlin
*Assistant Examiner*—L. Falasco
*Attorney, Agent, or Firm*—Lothrop & West

[57] ABSTRACT

Mounted in tandem on an elongated frame, a plurality of applicator head assemblies affords a versatile machine for bonding a decorative coating even to a relatively complicated pre-shaped edge of a workpiece. Means on the head for accurately positioning a rotatable applicator wheel having a circumference of silicone rubber profiled to match the edge permits the wheel to urge the coating with precision and uniformity onto the contoured edge of the substrate. An external radiant heat source raises the temperature of the silicone rubber periphery which, in turn, transfers heat by conduction to a transfer foil, thereby releasing the foil carrier and bonding the decorative film to the substrate edge. Pressure applied by the wheel in the plane of the wheel creates a wheel flat resulting in increased contact area and dwell time, thereby enhancing bonding precision and strength.

7 Claims, 8 Drawing Figures

FIG-4
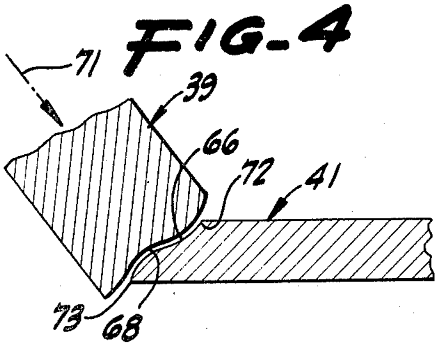
FIG-5
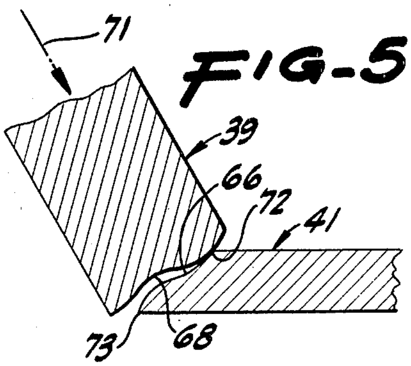
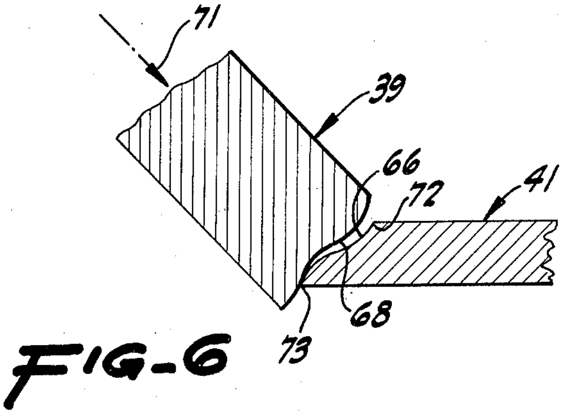
FIG-6
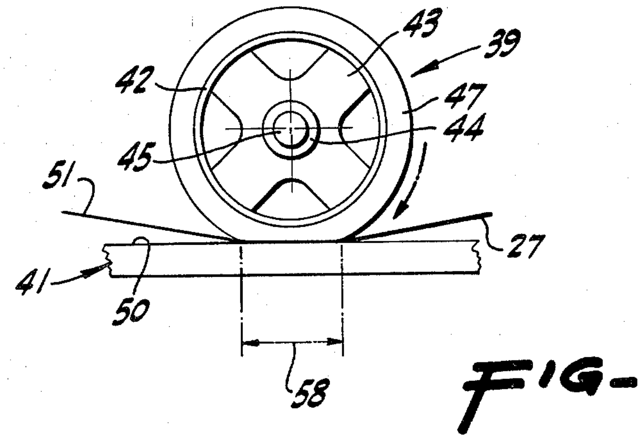
FIG-7

MACHINE FOR APPLYING TRANSFER FOIL TO A SHAPED EDGE OF A SUBSTRATE

BACKGROUND OF THE INVENTION

The invention relates to apparatus for applying the decorative coating, or decorative film, of a transfer foil to a workpiece and, more particularly, to a machine for applying such a coating to the edge of a substrate which may be of quite intricate configuration.

The term "transfer foil", as used herein, refers to an article sometimes designated as "hot stamp tape", as in the U.S. patents to Dunning, U.S. Pat. Nos. 3,666,516, 3,953,635, and 4,007,067; or as "hot stamping foil" as in U.S. Pat. No. 4,084,032 to Pasersky.

The market place as well as the patent literature affords various pieces of equipment for applying transfer foil to a preshaped edge of a substrate.

Exemplary of such apparatus in the U.S. patent literature are the following: Billings U.S. Pat. No. 3,669,793 and Boettcher U.S. Pat. No. 4,118,264. The latter patent provides an informative discussion of the "hot stamping" method using "foil", as does a paper called "Hot Stamping: A Breakthrough in Wood Finishing Technology" by E. G. Robb, presented to Forest Products Research Society, Homewood, Illinois, October 1978.

In the cabinet and furniture industry, many doors, side panels and tops are presently made from materials, such as reconstituted fiber board, which are less costly and more available than solid or veneered woods, the exposed surfaces of the boards being finished in a manner which closely simulates a desirable natural wood grain finish in appearance.

The flat, planar surfaces of these panels, or boards, as well as the less complicated edges, such as the edges found on shelving or on other relatively simple profiles, can readily be coated with the desired decorative film of transfer foil capable of being dry bonded to the substrate by heat and pressure. Machines of several makes can perform this relatively simple type of edge coating with speed and precision.

Where complicated pre-shaped edges must be coated, however, the prior art devices have been plagued with problems, such as wrinkles, bubbles and bonding skips, or gaps, which not only detract from the appearance of the finished edge but from its desirable physical properties as well.

It is believed, in other words, that in the field of applying transfer foil to a complicated shaped edge of a substrate, there is considerable room for improvement.

SUMMARY OF THE INVENTION

An elongated frame has transversely mounted, along one side, one or more transverse C-shaped sector plates on each of which is adjustably and tiltably mounted a respective heat and pressure head assembly including an applicator wheel having a periphery of resilient silicone rubber conjugately profiled for an accurate fit with the shaped edge of the substrate to be coated with a decorative film.

Any suitable equipment can be used to transport the workpiece in a horizontal attitude substantially tangent to the applicator wheel for film transfer. There are several commercial transporters which would serve the purpose.

Radiant heating coils adjacent the perimeter of each of the profiled applicator wheels maintains the wheels at an elevated temperature sufficient to produce separation between the decorative coating film and the carrier film of the transfer foil and simultaneously to cause the adhesive layer firmly to bond to the substrate under the biasing force provided by the resilient roller wheel.

Foil supply reels and carrier film rewind reels are customarily carried on the head assemblies and such reels tilt in unison with the respective one of the head assemblies. The rewind reels are driven at a controlled speed and apply the desired degree of tension to the foil in conjunction with the adjustable resistance afforded by the supply, or unwind, reel.

Foil guide rollers are also provided on each head assembly which includes supply and rewind reels. One of the guide rollers engages the transfer foil as it emerges from the supply reel and directs the foil onto the substrate at a very low angle of attack, e.g. five degrees, to assist in preventing wrinkles. A comparable guide roller engages and redirects the carrier film toward the rewind reel after separation of the decorative coating and the carrier film has occurred.

A substrate cleaning head is conveniently located at the upstream end of the frame and serves to clean and prepare the substrate for the subsequent application of the decorative coating provided by the transfer foil.

BRIEF DESCRIPTION OF THE DRAWING

FIG. 4 is a fragmentary sectional view, to an enlarged scale, showing the profiled applicator wheel prepared to being urged into full conjugate engagement with a shaped edge of a substrate;

FIG. 5 is a view similar to FIG. 4 but with the applicator wheel cocked slightly in one direction for engagement with one marginal portion only of the substrate;

FIG. 6 is a view similar to FIG. 5 but with the applicator wheel cocked slightly in the opposite direction for engagement with the other marginal portion only of the substrate;

FIG. 7 is a front elevational view showing schematically and to an exaggerated extent, the flattening of the silicone rubber periphery of the applicator wheel when urged forcefully against a substrate, the result being an increase in contact area, or dwell time; and, FIG. 8 is a fragmentary front elevational view, with portions broken away, showing the applicator wheel biasing and retracting mechanism.

DETAILED DESCRIPTION OF PREFERRED EMBODIMENT

Figure 1:
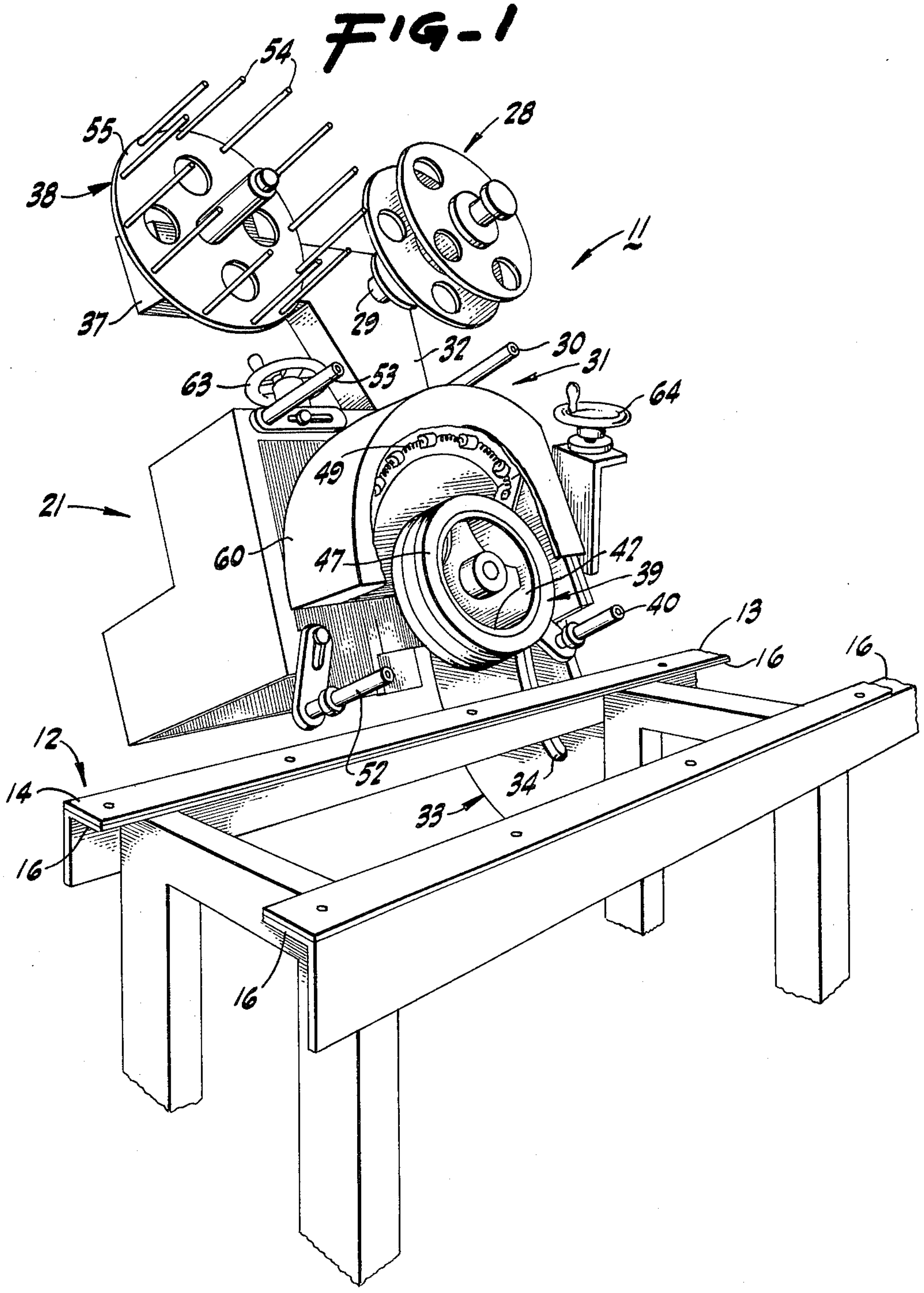
FIG. 1 is a fragmentary front perspective view of a typical head assembly of a machine embodying the present invention tiltably mounted on a C-shaped sector plate disposed transversely on the fore and aft frame, a portion of the arcuate, radiant heater hood being broken away to reveal interior details and the commercially available workpiece transporter being removed from the frame to clarify the disclosure.

While the transfer foil applicator of the invention is susceptible of numerous physical embodiments, depending on the environment and requirements of use, substantial numbers of the herein shown and described embodiment have been made, used and sold, and all have performed in an eminently satisfactory manner.

The foil applicator of the invention, generally designated by the reference numeral 11 includes an elongated fixed frame 12, or base, extending from a forward end 13 to an after end 14.

The top of the fixed frame 12 affords two spaced parallel top rails 16 utilized in conjunction with a suitable, conventional transporter 17 (see FIG. 3) to convey the workpiece through a cleaning station 15 (see FIG. 2) including a rotary brush 18 and a vacuum connected hood 19, or housing, which cleans the substrate and removes the dust, thence through an applicating station 20 preferably including an array of one, two, three or more substantially identical applicator head assemblies 21 arranged in tandem. In the drawing figures herein, only one such applicator head assembly 21 is shown in order to reduce the extent of the figures.

For intricately profiled edges, the first one of the applicator head assemblies 21 applies the coating by the use of heat and pressure and the following applicator head assemblies provide additional heat and pressure as will subsequently be described in detail.

This same arrangement of multiple heads also lends itself to high speed production.

In some instances an initial decorative edge coating is applied by the first head assembly and one or more subsequent overlying partial width decorative films, or strips, can be applied by subsequent head assemblies.

In other words, by having two or three head assemblies in tandem, versatility is afforded.

Figure 2:
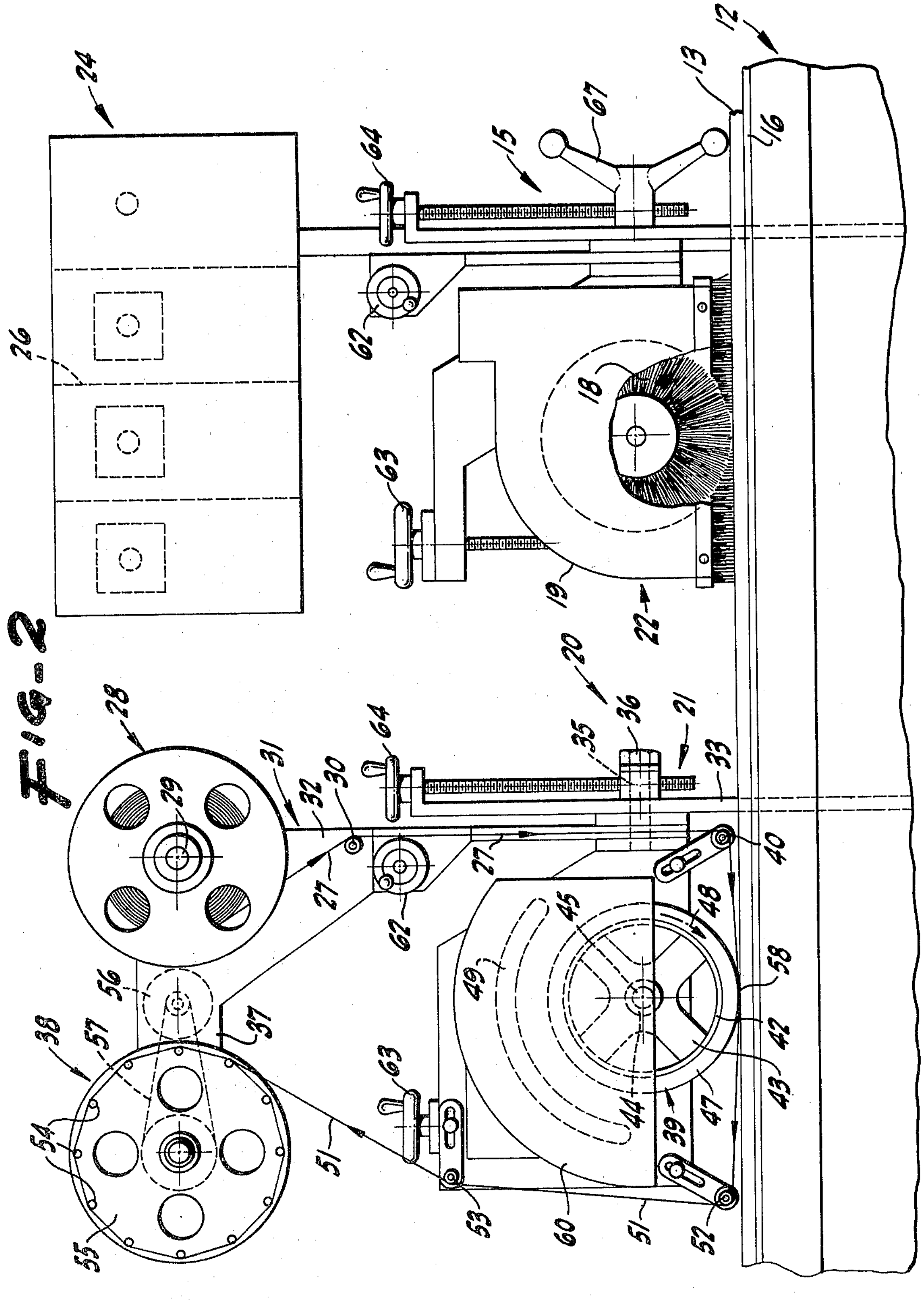
FIG. 2 is a fragmentary front elevational view of a typical substrate cleaning head and an adjacent downstream applicator head assembly, partly in schematic form, illustrating the path followed by the transfer foil, the commercially available workpiece transporter being removed to clarify the disclosure, and the front of the cleaning head being partially broken away to show the rotary brush.
Figure 3:
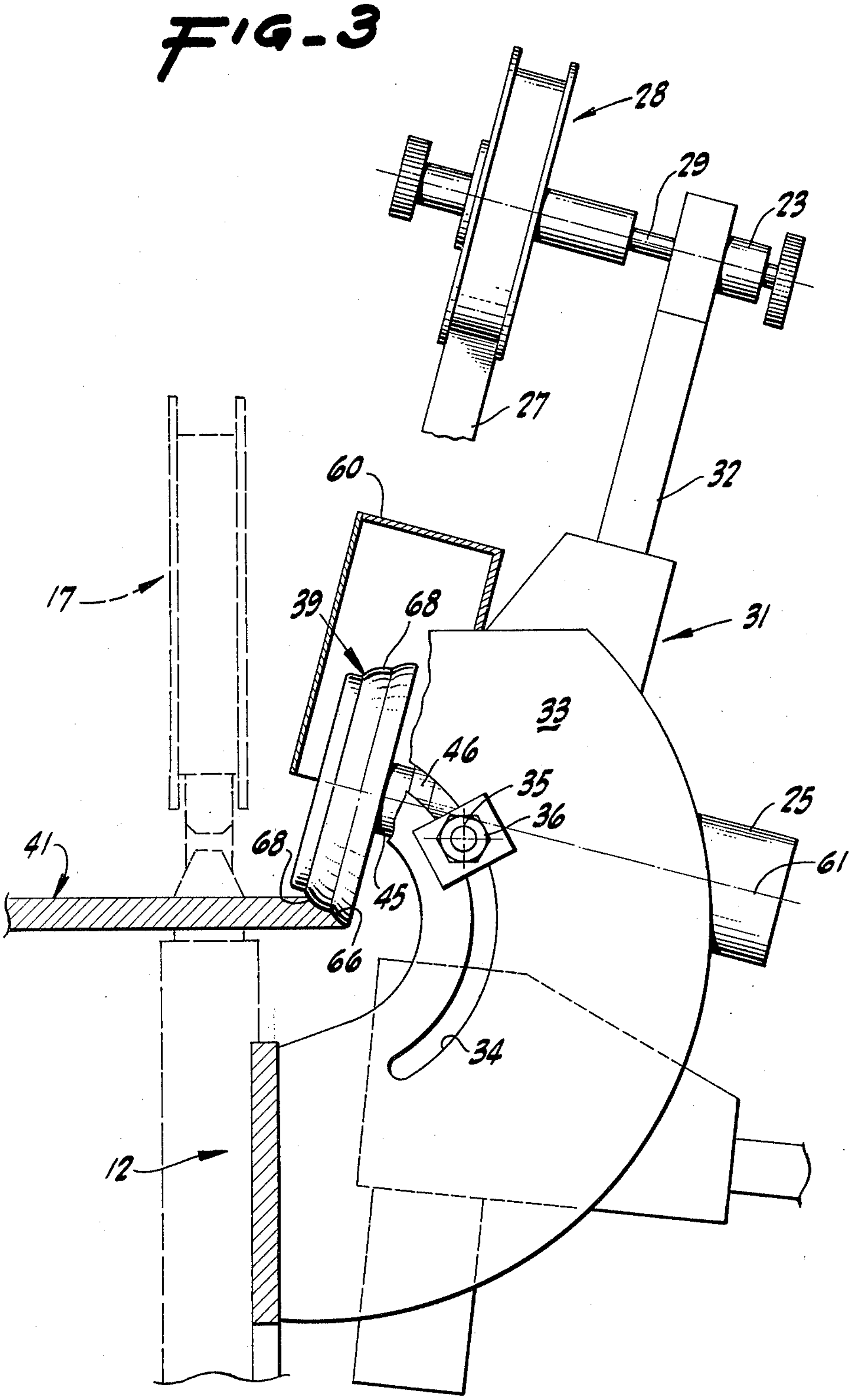
FIG. 3 is a fragmentary, end elevational view, partially schematic, to an enlarged scale, showing an applicator wheel in tilted attitude fully engaging a shaped edge of a workpiece being carried by a conventional, commercially available transporter, shown in dotted line, a portion of the C-shaped sector plate, the radiant heater hood and the transfer foil emerging from the supply reel being broken away to reveal the applicator wheel.

The cleaning head assembly 22 and applicator head assembly 21 shown in FIG. 2, as well as two, three or even more substantially identical downstream head assemblies (not shown), are controlled by suitable switches and attendant electrical circuitry, using components of conventional make. These components are conveniently located in a control box 24. The usual control knobs, switches and the like are displayed on a control panel 26 on the rear side of the control box 24 (see FIG. 2).

The transfer foil 27 is wound on a supply reel 28 from which the foil is unwound, the foil 27 passing downwardly over a rotatable upper primary guide roller 30 mounted on a tiltable applicator head assembly frame 31, as shown in FIGS. 1 and 2. The supply reel 28 is mounted on a shaft 29 journaled on the frame 31.

The tiltable applicator head assembly frame 31 includes an inverted L-shaped structure having the lower end of its vertical leg 32 adjustably mounted on a C-shaped sector plate 33 positioned transversely on the elongated fixed frame 12. The sector plate 33 includes an arcuate slot 34 through which a large bolt 35 extends. One end of the bolt 35 supports the vertical leg 32 of the applicator head assembly frame 31 and by tightening a nut 36 on the other end of the bolt 35, the frame 31 can be positioned at any desired degree of tilt (see FIG. 3).

The inverted L-shaped head assembly frame also includes a horizontal leg 37 on the distal end of which is rotatably mounted a suitably driven carrier film rewind spool 38, or take-up spool, or reel.

The transfer foil supply reel 28 is rotatably mounted on the tiltable head assembly 31 at the junction of the horizontal leg 37 and the vertical leg 32. A suitable conventional resistance, or drag, device 23 engages the shaft 29 of the foil supply reel 28 so that the foil tension can be appropriately adjusted in combination with the pull exerted by the motor driven rewind, or takeup, reel 38.

The transfer foil emerging from the supply reel 28 first passes over the upper primary guide roller 30, then changes direction as it rounds a lower primary roller 40 and passes under the bottom portion of an applicator roller 39, or applicator wheel, rotatably mounted on the tiltable applicator head assembly frame 31. During the time that the foil 27 is being applied to the substrate 41, or workpiece, the translational speed of the workpiece, the rotation of the applicator wheel 39 and the foil supply rate are all in synchronism so that the film is applied free from wrinkles. The wheel 39 is urged with considerable pressure against the substrate 41 and the transfer foil 27 is maintained under a predetermined tension by cooperation of the driven rewind spool 38 and the supply reel 28. As a result, the applicator wheel 39 is rotated synchronously by friction of the film and substrate.

During the intervals when the applicator wheel 39 is not being rotated by frictional engagement with the foil and the substrate, the applicator wheel is driven slowly by a small motor 25 which is connected to the applicator wheel 39 by a conventional one-way dog clutch 46, thereby preventing the formation of a deleterious "hot-spot" on the perimeter of the applicator wheel.

The applicator wheel 39 includes a rim 42 with spokes 43 and a hub 44 mounted on a shaft 45 connected to the shaft drive motor 25 through the one-way dog clutch 46 as previously indicated. The circumference of the rim 42 is covered by a thick peripheral band of silicone rubber 47 which is profiled to match the contours of the substrate edge.

During the time the applicator wheel 39 is rotated, in the direction indicated by the arrow 48 in FIG. 2, by the moving substrate, the peripheral layer of silicone rubber 47 is uniformly heated by an arcuate bank 49 of heated filaments covered by an arcuate hood 60. The head bank 49 provides sufficient radiant energy to raise the temperature of the silicone rubber layer 47 to an amount sufficient to separate the decorative coating 50, or decorative film layer of the foil 27 from the carrier layer 51 and to bond the decorative coating 50 to the substrate 41.

As this transfer occurs, the separated carrier 51 advances, turns around a lower secondary guide roller 52, thence around an upper secondary guide roller 53 and reels up on a plurality of circularly arranged rods 54 projecting normally outwardly from a circular reel plate 55. A drive motor 56 connected to the take-up spool 38 by a timing belt 57 rotates the take-up spool 38, the motor speed being synchronized with the speed of advance of the substrate 41, as previously explained.

When the trailing end of the substrate 41 reaches the contact zone 58 (see FIG. 2) and then passes beyond the contact zone, the applicator wheel 39 would cease rotation were it not for its small drive motor 25 which constantly rotates. However, because of the small drive motor 25 and the dog clutch 46, the instant that the substrate 41 no longer engages the applicator wheel 39, the dog clutch 46 engages the small drive motor with the applicator wheel 39, which, then, continues to rotate in the direction of the arrow 48. This arrangement precludes only one portion of the peripheral layer of silicone rubber 47 from being subjected to radiant energy from the heat bank 49 and thus being damaged by overheating.

As previously explained, the entire applicator head frame 31 can be tilted, within limits, to any desired transverse inclination in order to match precisely the inclination of the shaped contour of the edge of the substrate 41. In addition, the applicator roller 39 is capable of being shifted, or adjusted, in a direction parallel to its own axis of rotation 61 by appropriate rotation of a wheel 62, as shown in FIG. 2. Adjustment in the plane of the wheel (right angles to axis 61) is afforded by rotation of the wheel 63, as in FIGS. 1 and 2, and fine tilting adjustment of the entire assembly is provided by the wheel 64.

The cleaning head assembly 22 is generally similar in construction to the applicator head assembly 21 and is likewise capable of being tilted transversely to the path of the workpiece in order effectively to brush the profiled edge 66 of the substrate 41. Clamping of the brush head assembly 22 for tilt angle is afforded by a handle clamp 67.

As stated above, the path of the transfer foil 27, after emerging from the supply reel 28, is initially established by an upper primary guide roller 30. The transfer foil passes over the upper primary guide roller 30 and then proceeds downwardly into rolling engagement with the lower primary guide roller 40 which redirects the foil forwardly at a very low angle of attack toward the zone 58 of foil application where engagement occurs between the superposed applicator roller 39 and the foil on the one hand and between the foil and the underlying profiled edge 66 of the substrate 41 on the other hand (see FIG. 2).

The angle of attack between the foil and the moving substrate 41 is very low, being on the order of five degrees or less, thereby helping to preclude the formation of wrinkles and other anomalies in the finished coating.

In the application zone 58 the film of decorative coating 50 is separated from the transfer foil 27, by heat from the applicator roller 39, and is pressure-deposited on the substrate 41, the various contours of the substrate 41 being faithfully followed by a conjugately formed profile 68 in the perimetral band 47 of silicone rubber, thereby urging the decorative coating 50 into total contact with the sometimes intricate configurations of the pre-shaped edge 66 of the substrate 41.

It is to be noted, at this juncture, that the resiliency of the silicone rubber material forming the periphery of the applicator roller 39 affords a most beneficial result in that not only does the material yield under roller pressure so as to bias the decorative coating into the most complicated of shaped edges but the resilient material also "flattens", somewhat, in the contact zone 58 and thereby enlarges the fore and aft extent of the contact zone. Stated in terms of time of contact the applicator roller 39 dwells, or remains, for a relatively lengthy time, in contact with the foil 27 and the substrate 41. Thus, the amount of heat which can be transferred from the heated peripheral surface of the roller 39 to the film is enhanced. Heat transfer efficiency is thereby increased and is relatively superior to that achieved, for example, by unyielding steel applicator rollers in which contact is "point to point" or, more strictly, "line to line", and lasts for only an instant of time.

By increasing the number of applicator rollers 39 to two or three, or even more, in tandem, an exceptionally smooth and tight coating results, one that accurately follows all of the substrate contours even when they are very complex in profile.

In other words, it has been found that the first of the applicator heads 39 can most effectively be used if its main force vector 71 is substantially at right angles to an inclined plane including the transverse extremities 72 and 73 of the profiled edge 66 of substrate 41.

FIGS. 4, 5 and 6 illustrate the advantageous arrangement made possible by placing three of the applicator wheels 39 in tandem.

FIG. 4 shows the placement of the first one of the applicator wheels 39, wherein the profile 68 formed in the silicon rubber is in precise register with the profiled edge 66 of the substrate 41. As registry is arrived at by suitable adjustment of the wheels 64 and 62, the wheel 63 is rotated so that the force indicated by the arrow 71 biases the two conjugate profiles 68 and 66 together, the heat and pressure creating a strong bond between the decorative film and the substrate edge in the area between the ends 72 and 73 of the profiled edge 66 of the substrate 41.

The second one of the applicator wheels 39, as shown in FIG. 5, is cocked upwardly to a slight extent so that its silicon rubber profile 68 presses against the upper end portion 72 of the substrate edge 66. In this instance, the force 71 is brought to bear in the upper end portion 72 and securely bands the decorative film (not shown because of its extreme thinness) in that region.

Finally, as appears in FIG. 6, the third one of the applicator wheels 39 is cocked slightly downwardly so that the rolling bonding force is brought to bear in the lower end portion 73 of the substrate edge 66 thereby creating a strong bond in that vicinity.

It can therefore be seen that the initial application of heat and pressure in the intermediate area, followed quickly in succession by two additional applications covering both end regions (not merely the tip ends) results in an entirely satisfactory bond.

As previously indicated, the applicator wheel 39 is urged against the substrate 41 with a pre-load that yields a favorable dividend in the way of additional dwell time during which heat from the silicon rubber profile 68 can flow by conduction into the foil, thereby effecting separation of the decorative coating and the carrier film as well as providing adhesive bonding of the coating 50 to the substrate 41.

It has been found that a pressure of about ninety pounds per square inch provides a most effective "wheel flat" or contact zone 58 on the workpiece, as illustrated diagrammatically in FIG. 7, which shows the portion of the silicone rubber periphery 47 flattened where it engages, under pressure, the unyielding surface of the substrate 41. In terms of time duration, the transfer foil 27 is heated for a longer period. The contact "dwell time" must not be too long or pattern distortion will result. On the other hand, too little dwell time will cause spotty or complete lack of adhesion and imperfect foil transfer, a condition in the industry which sometimes accompanies the use of burnished steel rollers where the contact is substantially "line to line" in area and instantaneous in time.

It can therefore be seen that the cumulative effect of the various cooperating features is to provide a machine which is not only versatile but which also finishes even complicated edge profiles with precision and dispatch. The multiple head assemblies, in other words, can be used either to bond a series of decorative coatings of different widths on a given edge, by using more than one supply reel in tandem; or, by using only one supply reel but multiple heated applicator heads in tandem, accelerate the application rate and effect accurate bonding even on complicated substrate edges.

Figure 8:
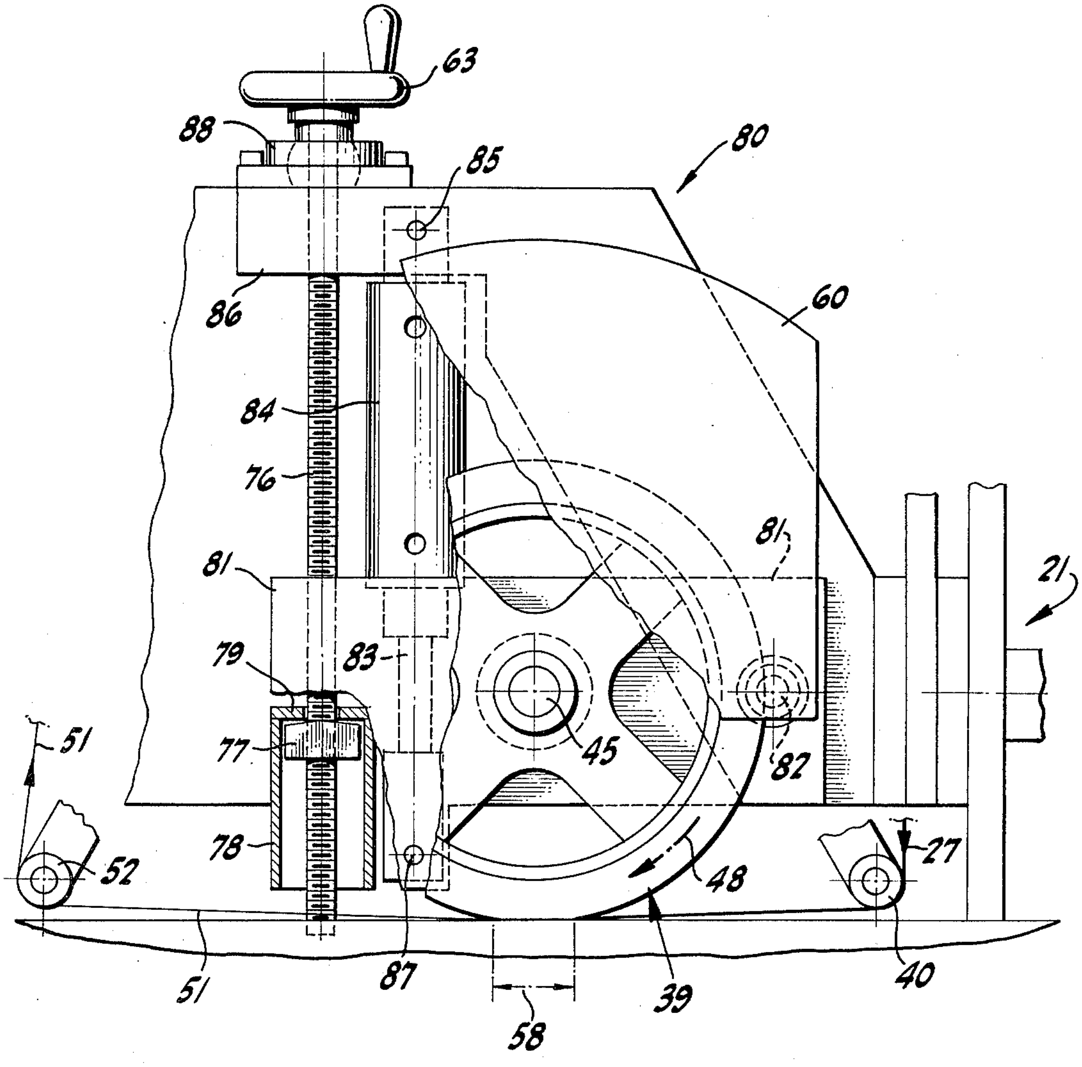

In order to (1) control the extent of the wheel flat 58 and (2) retract the wheel 38 from the transfer foil 27 as soon as a piece of substrate has moved on or the substrate advance has been halted for any reason the mechanism 80 shown most clearly in FIG. 8 is provided.

The shaft 45 of the applicator wheel 39 is journaled in a vertical, horizontally elongated plate 81 rockably mounted on a pin 82 carried by the head assembly frame 21. Thus, by raising and lowering the left-hand end of the mounting plate 87, the applicator wheel 39 is correspondingly elevated and lowered. Lowering of the plate 81 and the wheel 39 is effected by projecting the plunger 83 of a hydraulic ram 84 pivotally mounted at its upper end on a pin 85 in a cantilever 86 of the frame 21. The lower end of the plunger 83 is pivotally mounted on a pin 87 connected to the plate 81.

Downward movement of the plunger 83 and the plate 81 is restricted by interference between a nut 77, captive within a vertical, square in section tube 78 welded to the plate 81, and a horizontal limit stop cap 79 spanning the top of the tube. By rotating the hand wheel 63 connected to a threaded rod 76 engaging the nut 77, the vertical position of the nut is adjusted to provide the extent of wheel flat 58. The threaded rod 76 is journaled at its upper end in a conventional tiltable bearing 88. Should the substrate advance beyond the wheel 39 or if the machinery is halted for any reason, electrical sensors, not shown, actuate the ram 84 and retract the plunger 83, thereby elevating the plate 81 and the wheel 39 out of contact with the foil 27, thus preventing any possible damage. As can be seen the nut 77 does not interfere with upward movement of the plate 81 and wheel 39 but it does afford control over the extent of downward movement thereof.

I claim:

1. A machine for applying transfer foil to a shaped edge of a substrate, said machine comprising:

a. an elongated frame having opposite lateral sides and extending from a forward end to an after end;

b. transport means adjacent said frame for advancing the substrate from said forward end toward said after end with the shaped edge facing toward one of said lateral sides of said frame;

c. means on said frame for supplying transfer foil to the shaped edge in synchronism with the speed of advance of the substrate;

d. an applicator wheel rotatably mounted on said one lateral side of said frame, said wheel having a periphery of resilient material profiled to conform to the shaped edge;

e. means for radiantly heating the periphery of said wheel to a temperature sufficient to effect transfer of the foil coating to the shaped edge;

f. means for biasing said wheel against the shaped edge with sufficient force to flatten the resilient material of said wheel so that the heated material remains in heat transferring contact with the transfer foil for a dwell period substantially in excess of the substantially instantaneous contact which obtains in a line engagement;

g. means for guiding the transfer foil between the shaped edge and the adjacent periphery of said wheel at a constant attack angle on the order of five degrees or less thereby helping to preclude the formation of wrinkles and other anomalies in the foil coating transferred to the shaped edge;

h. an arcuately slotted C-shaped sector plate mounted transversely on said one lateral side of said frame, a shaft, means for positioning said shaft at predetermined angular attitudes on said sector plate, means for mounting said applicator wheel on one end of said shaft, and an electrical motor in driving engagement with the other end of said shaft; and, i. a one-way dog clutch interposed in said shaft between said applicator wheel and said motor, said clutch being effective to drive said applicator wheel from said motor when said applicator wheel and the transfer foil are disengaged.

2. A machine as in claim 1 including means mounted on said frame for rewinding the foil carrier film.

3. A machine as in claim 1 including a rotary brush rotatably mounted on said frame ahead of said applicator wheel for cleaning engagement with the shaped edge.

4. A machine as in claim 2 in which said foil supplying means and said foil rewinding means include means for controlling the foil tension to help provide a wrinkle free finish.

5. A machine as in claim 1 in which said wheel biasing means includes a vertical ram and plunger connected at one end to said frame and at the other end to said wheel, said ram and plunger being selectively capable of biasing said wheel downwardly into engagement with the shaped edge and of elevating said wheel away from the shaped edge; and means for limiting the extent of downward movement of said wheel to provide a predetermined amount of wheel flat and consequent dwell time.

6. A machine for applying transfer foil to a shaped edge of a substrate, said machine comprising:

a. an elongated frame having opposite lateral sides and extending from a forward end to an after end;

b. transport means adjacent said frame for advancing the substrate from said forward end toward said after end with the shaped edge facing toward one of said lateral sides of said frame;

c. means on said frame for supplying transfer foil to the shaped edge in synchronism with the speed of advance of the substrate;

d. an applicator wheel rotatably mounted on said one lateral side of said frame, said wheel having a periphery of resilient material profiled to conform to the shaped edge;

e. means for radiantly heating the periphery of said wheel to a temperature sufficient to effect transfer of the foil coating to the shaped edge;

f. means for biasing said wheel against the shaped edge with sufficient force to flatten the resilient material of said wheel so that the heated material remains in heat transferring contact with the transfer foil for a dwell period substantially in excess of the substantially instantaneous contact which obtains in a line engagement;

g. means for guiding the transfer foil between the shaped edge and the adjacent periphery of said wheel at a constant attack angle on the order of five degrees or less thereby helping to preclude the formation of wrinkles and other anomalies in the foil coating transferred to the shaped edge;

h. an arcuately slotted C-shaped sector plate mounted transversely on said one lateral side of said frame, a shaft, means for positioning said shaft at predetermined angular attitudes on said sector plate, means for mounting said applicator wheel on one end of said shaft, and an electrical motor in driving engagement with the other end of said shaft;

i. a plurality of said applicator wheels, each provided with respective ones of said heating means, said biasing means and said foil guiding means, and arranged in tandem. and, j. a one-way dog clutch interposed in said shaft between said applicator wheel and said motor, said clutch being effective to drive said applicator wheel from said motor when said applicator wheel and the transfer foil are disengaged.

7. A machine as in claim 6 in which the first of said wheels is aligned to match and engage accurately the contour of the shaped edge, in which the next of said wheels engages one of the marginal portions only of the shaped edge, and in which the next of said wheels engages the other of the marginal portions only of the shaped edge.

* * * * *